United States Patent
Maher et al.

(10) Patent No.: US 10,535,131 B2
(45) Date of Patent: Jan. 14, 2020

(54) SYSTEMS AND METHODS FOR REGION-ADAPTIVE DEFECT DETECTION

(71) Applicant: KLA-Tencor Corporation, Milpitas, CA (US)

(72) Inventors: Christopher Maher, Campbell, CA (US); Bjorn Brauer, Beaverton, OR (US); Vijayakumar Ramachandran, Sunnyvale, CA (US); Laurent Karsenti, Rehovot (IL); Eliezer Rosengaus, Palo Alto, CA (US); John R. Jordan, III, Mountain View, CA (US); Roni Miller, Hod Hasharon (IL)

(73) Assignee: KLA-Tencor Corporation, Milpitas, CA (US)

( * ) Notice: Subject to any disclaimer, the term of this patent is extended or adjusted under 35 U.S.C. 154(b) by 424 days.

(21) Appl. No.: 15/350,632

(22) Filed: Nov. 14, 2016

(65) Prior Publication Data

US 2017/0140516 A1 May 18, 2017

Related U.S. Application Data

(60) Provisional application No. 62/257,025, filed on Nov. 18, 2015.

(51) Int. Cl.
*G06K 9/62* (2006.01)
*G06K 9/74* (2006.01)
*G06T 7/00* (2017.01)
*G06T 7/11* (2017.01)

(52) U.S. Cl.
CPC ............ *G06T 7/001* (2013.01); *G06K 9/6202* (2013.01); *G06K 9/6212* (2013.01); *G06K 9/74* (2013.01); *G06T 7/11* (2017.01); *G06T 2207/20182* (2013.01); *G06T 2207/30148* (2013.01)

(58) Field of Classification Search
None
See application file for complete search history.

(56) References Cited

U.S. PATENT DOCUMENTS

| | | |
|---|---|---|
| 6,154,714 A | 11/2000 | Lepejian |
| 6,539,106 B1 | 3/2003 | Gullarda et al. |
| 7,570,796 B2 | 8/2009 | Zafar et al. |
| 7,676,007 B1 | 3/2010 | Choi et al. |
| 7,676,077 B2 | 3/2010 | Kulkarni et al. |
| 8,041,103 B2 | 10/2011 | Kulkarni et al. |
| 8,126,255 B2 | 2/2012 | Bhaskar et al. |
| 8,139,843 B2 | 3/2012 | Kulkarni et al. |
| 8,702,566 B2 | 4/2014 | Mazzanobile et al. |
| 9,222,895 B2 | 12/2015 | Duffy et al. |
| 2005/0010890 A1 | 1/2005 | Nehmadi et al. |

(Continued)

*Primary Examiner* — David Perlman
(74) *Attorney, Agent, or Firm* — Suiter Swantz pc llo

(57) ABSTRACT

A defect detection method includes acquiring a reference image; selecting a target region of the reference image; identifying, based on a matching metric, one or more comparative regions of the reference image corresponding to the target region; acquiring a test image; masking the test image with the target region of the reference image and the one or more comparative regions of the reference image; defining a defect threshold for the target region in the test image based on the one or more comparative regions in the test image; and determining whether the target region of the test image contains a defect based on the defect threshold.

54 Claims, 13 Drawing Sheets

(56) References Cited

U.S. PATENT DOCUMENTS

| | | | |
|---|---|---|---|
| 2009/0041332 A1* | 2/2009 | Bhaskar | G01N 21/93 |
| | | | 382/145 |
| 2009/0196490 A1 | 8/2009 | Matsumiya | |
| 2010/0198389 A1* | 8/2010 | Schulze | G06T 7/0006 |
| | | | 700/110 |
| 2011/0274342 A1* | 11/2011 | Maeda | G01N 21/95623 |
| | | | 382/149 |
| 2013/0336573 A1* | 12/2013 | Dalla-Torre | G06T 7/001 |
| | | | 382/145 |
| 2013/0336575 A1* | 12/2013 | Dalla-Torre | G06T 7/001 |
| | | | 382/149 |
| 2014/0193065 A1 | 7/2014 | Chu et al. | |
| 2015/0310600 A1 | 10/2015 | Dalla-Torre et al. | |
| 2015/0332451 A1* | 11/2015 | Amzaleg | G06T 7/001 |
| | | | 382/149 |

\* cited by examiner

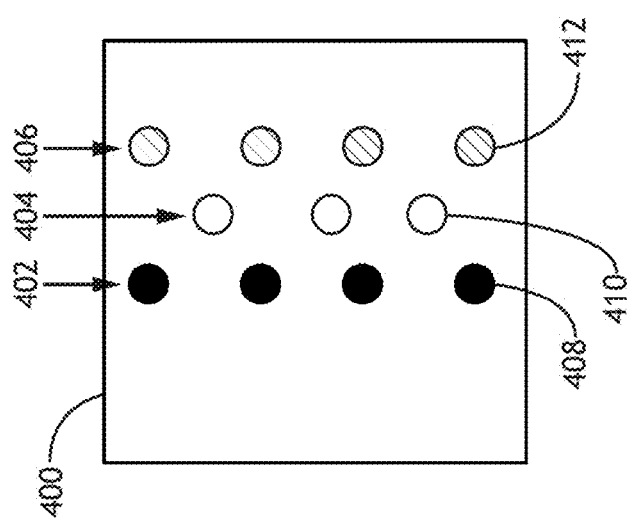

SYSTEMS AND METHODS FOR REGION-ADAPTIVE DEFECT DETECTION

CROSS-REFERENCE TO RELATED APPLICATION

The present application claims the benefit under 35 U.S.C. § 119(e) of U.S. Provisional Application Ser. No. 62/257,025, filed Nov. 18, 2015, entitled AUTOMATED GENERALIZED REGION ADAPTIVE DEFECTIVE ENGINE (A-GRADE), naming Laurent Karsenti, Eliezer Rosengaus, John Jordan, and Roni Miller as inventors, which is incorporated herein by reference in the entirety.

TECHNICAL FIELD

The present disclosure relates generally to defect detection, and, more particularly, to region-adaptive defect detection.

BACKGROUND

Inspection systems identify and classify defects on semiconductor wafers to generate a defect population on a wafer. A given semiconductor wafer may include hundreds of chips, each chip containing thousands of components of interest, and each component of interest may have millions of instances on a given layer of a chip. As a result, inspection systems may generate vast numbers of data points (e.g. hundreds of billions of data points for some systems) on a given wafer. Further, the push for ever-shrinking devices leads to increased demands on inspection systems. The demands include the need for increased resolution and capacity without sacrificing inspection speed or sensitivity.

The sensitivity of defect detection is critically dependent on sources of noise in the defect detection method. For example, typical defect detection systems generate a difference image between a test image and a reference image in which defects in the test image are manifest as a difference between pixel values in the test image and the reference image. However, noise associated with the reference image and/or the test image reduces the defect detection sensitivity. Some additional defect detection systems utilize multiple reference images (e.g. from different wafers, different dies, different regions of a repeating pattern within a die, or the like) in an attempt to increase the sensitivity. Even so, such systems are inherently susceptible to reference data noise, which ultimately limits the defect detection sensitivity. Therefore, it would be desirable to provide a system and method for curing shortcomings such as those identified above.

SUMMARY

A defect detection method is disclosed, in accordance with one or more illustrative embodiments of the present disclosure. In one illustrative embodiment, the method includes acquiring a reference image. In another illustrative embodiment, the method includes selecting a target region of the reference image. In another illustrative embodiment, the method includes identifying, based on a matching metric, one or more comparative regions of the reference image corresponding to the target region. In another illustrative embodiment, the method includes acquiring a test image. In another illustrative embodiment, the method includes masking the test image with the target region of the reference image and the one or more comparative regions of the reference image. In another illustrative embodiment, the method includes defining a defect threshold for the target region in the test image based on the one or more comparative regions in the test image. In another illustrative embodiment, the method includes determining whether the target region of the test image contains a defect based on the defect threshold.

A defect detection system is disclosed in accordance with one or more illustrative embodiments of the present disclosure. In one illustrative embodiment, the system includes an inspection sub-system. In another illustrative embodiment, the inspection sub-system includes an illumination source to generate a beam of illumination. In another illustrative embodiment, the inspection sub-system includes a set of illumination optics to direct the beam of illumination to a sample. In another illustrative embodiment, the system includes a detector to collect illumination emanating from the sample. In another illustrative embodiment, the system includes a controller communicatively coupled to the detector. In another illustrative embodiment, the controller is configured to acquire a reference image. In another illustrative embodiment, the controller is configured to select a target region of the reference image. In another illustrative embodiment, the controller is configured to identify, based on a matching metric, one or more comparative regions of the reference image corresponding to the target region. In another illustrative embodiment, the controller is configured to acquire a test image. In another illustrative embodiment, the controller is configured to mask the test image with the target region of the reference image and the one or more comparative regions of the reference image. In another illustrative embodiment, the controller is configured to define a defect threshold for the target region in the test image based on the one or more comparative regions in the test image. In another illustrative embodiment, the controller is configured to determine whether the target region of the test image contains a defect based on the defect threshold.

A defect detection system is disclosed in accordance with one or more illustrative embodiments of the present disclosure. In one illustrative embodiment, the system includes an inspection sub-system. In another illustrative embodiment, the inspection sub-system includes an illumination source to generate a beam of illumination. In another illustrative embodiment, the inspection sub-system includes a set of illumination optics to direct the beam of illumination to a sample. In another illustrative embodiment, the system includes a detector to collect illumination emanating from the sample. In another illustrative embodiment, the system includes a controller communicatively coupled to the detector. In another illustrative embodiment, the controller is configured to acquire a reference image. In another illustrative embodiment, the controller is configured to select a target pixel of the reference image. In another illustrative embodiment, the controller is configured to define a vicinity pattern including a defined layout of pixels. In another illustrative embodiment, the controller is configured to define a target vicinity in the reference image arranged according to the vicinity pattern. In accordance with one or more illustrative embodiments of the present disclosure, the target vicinity includes the target pixel. In another illustrative embodiment, the controller is configured to identify, based on a matching metric, one or more comparative vicinities of the reference image corresponding to the target region. In accordance with one or more illustrative embodiments of the present disclosure, the matching metric includes a pixel value distribution of the target vicinity. In another illustrative embodiment, the controller is configured to acquire a test image. In another illustrative embodiment, the controller is configured to mask the test image with the target region of the reference image and the one or more comparative vicinities of the reference image. In another illustrative embodiment, the controller is configured to calculate one or more pixel value distributions of the one or more comparative vicinities of the test image. In another illustrative embodiment, the controller is configured to estimate a pixel value distribution in the target vicinity of the test image based on the pixel value distributions of the one or more comparative vicinities of the test image. In another illustrative embodiment, the controller is configured to define the defect threshold for the target pixel based on the estimated pixel value distribution in the target vicinity. In another illustrative embodiment, the controller is configured to determine whether the target pixel of the test image contains a defect based on the defect threshold.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 4A is a conceptual view of a reference image having multiple target regions, in accordance with one or more embodiments of the present disclosure.

DETAILED DESCRIPTION

Figure 1:
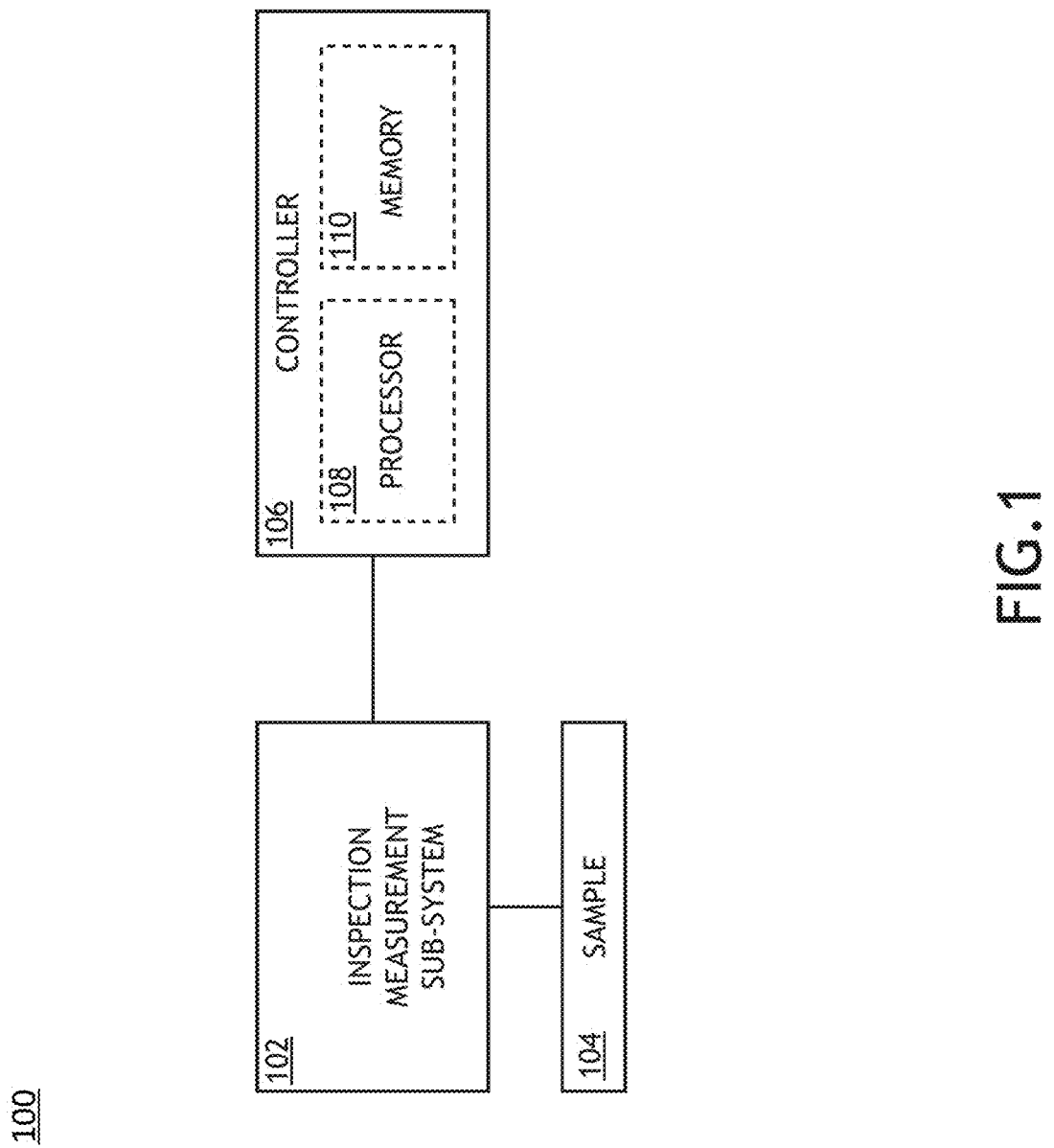
FIG. 1 is a conceptual view of an inspection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for region-adaptive defect detection. In this regard, redundant information in a test image may be used to determine regions of the test image with similar characteristics (e.g. comparative regions). Accordingly, defect detection thresholds may be generated based on the pixel values in the comparative regions of the test image. Embodiments of the present disclosure are directed to determining comparative regions on a test image directly without using a reference image. Additional embodiments of the present disclosure are directed to determining comparative regions on a reference image using reference data (e.g. reference images, design data, or the like) and masking the test image with the comparative regions. In this way, the reference data may facilitate accurate determination of the comparative regions in the test image, but defect detection thresholds may be based solely on pixel values of the test image. Further embodiments of the present disclosure are directed to the determination of pixel-specific defect detection thresholds. For example, for each pixel in a reference image, a distribution of pixel values in a vicinity of surrounding pixels may be compared to similar vicinities throughout the test image to determine whether a defect is present for that pixel. Additional embodiments of the present disclosure are directed to segmenting the test image into multiple segments and determining a region-specific defect detection threshold for each segment. For example, a test image may be segmented according to regions with similar pixel values (e.g. graylevel pixel values, or the like) and region-specific defect detection thresholds may be determined for each segment.

It is recognized herein that typical defect detection systems may detect defects by comparing a test image to one or more reference images (e.g. by the generation of one or more difference images, or the like). A reference image may be associated with another die (e.g. die-to-die detection, or the like) or another cell (e.g. cell-to-cell detection, or the like). However, noise associated with reference images may critically reduce the defect detection sensitivity. Attempts to overcome reference image noise by utilizing multiple reference images may negatively impact additional system performance metrics such as, but not limited to, throughput or processing requirements. For example, comparing a test image to two reference images presents challenges because a defect is only flagged if identified by a comparison to both images. Such a system remains limited by reference image noise. By way of another example, some defect detection systems seek to generate an "optimized" (e.g. a golden) reference image. For instance, an "optimized" reference image may include a statistical aggregation of multiple reference images such as, but not limited to, a median die in which each pixel of a reference image represents a median of corresponding pixels in multiple reference images. Similarly, such systems may still suffer from low sensitivity, particularly for test images that also exhibit noise. Additional embodiments of the present disclosure provide for the determination of defect thresholds based on pixel values of the test image rather than a reference image, which may circumvent reference image noise.

It is further recognized herein that defect detection systems may divide the sample into multiple portions such that structures on the sample within each portion may be expected to have similar characteristics. Further, such systems may separately interrogate each portion to provide a statistical comparison of similar structures within each portion. For example, such defect detection systems may employ, but are not limited to, Segmented Auto-Thresholding (SAT), Multi-die Adaptive-Thresholding (MDAT/MDAT2), Hierarchical and Local Auto-Thresholding (HLAT), Context-Based Imaging (CBI), Standard Reference Patch (SRP), or Template-Based Inspection (TBI). Inspection systems using design data of a sample to facilitate inspection is generally described in U.S. Pat. No. 7,676,077, issued on Mar. 9, 2010, U.S. Pat. No. 6,154,714, issued on Nov. 28, 2000, and U.S. Pat. No. 8,041,103, issued on Oct. 18, 2011, which are incorporated herein by reference in their entirety.

However, separately interrogating different portions of the sample may introduce measurement effects that may negatively impact the detection sensitivity. For example, particle-based imaging methods (e.g. scanning electron microscopy, focused ion beam imaging, and the like) may introduce charging effects that may be highly dependent on the measurement area. For example, a pixel surrounded by an edge and imaged over a large measurement area may behave differently than a pixel imaged by a measurement area defined by the same edge. Additional embodiments of the present disclosure identify comparative regions within a full image with a large measurement area, which may circumvent artificial measurement effects.

As used throughout the present disclosure, the term "sample" generally refers to a substrate formed of a semiconductor or non-semiconductor material (e.g. a wafer, or the like). For example, a semiconductor or non-semiconductor material may include, but is not limited to, monocrystalline silicon, gallium arsenide, and indium phosphide. A sample may include one or more layers. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

FIG. 1 is a conceptual view of an inspection system 100, in accordance with one or more embodiments of the present disclosure. In one embodiment, the inspection system 100 includes an inspection measurement sub-system 102 to interrogate a sample 104. For example, the inspection measurement sub-system 102 may detect one or more defects on the sample 104

It is noted herein that inspection measurement sub-system 102 may be any type of inspection system known in the art suitable for detecting defects on a sample 104. For example, the inspection measurement sub-system 102 may include a particle-beam inspection sub-system. Accordingly, inspection measurement sub-system 102 may direct one or more particle beams (e.g. electron beams, ion beams, or the like) to the sample 104 such that one or more defects are detectable based on detected radiation emanating from the sample 104 (e.g. secondary electrons, backscattered electrons, luminescence, or the like). As another example, inspection measurement sub-system 102 may include an optical inspection sub-system. Accordingly, inspection measurement sub-system 102 may direct optical radiation to the sample 104 such that one or more defects are detectable based on detected radiation emanating from the sample 104 (e.g. reflected radiation, scattered radiation, diffracted radiation, luminescent radiation, or the like).

The inspection measurement sub-system 102 may operate in an imaging mode or a non-imaging mode. For example, in an imaging mode, individual objects (e.g. defects) may be resolvable within the illuminated spot on the sample (e.g. as part of a bright-field image, a dark-field image, a phase-contrast image, or the like). In a non-imaging mode of operation, radiation collected by one or more detectors may be associated with a single illuminated spot on the sample and may represent a single pixel of an image of the sample 104. In this regard, an image of the sample 104 may be generated by acquiring data from an array of sample locations. Further, the inspection measurement sub-system 102 may operate as a scatterometry-based inspection system in which radiation from the sample is analyzed at a pupil plane to characterize the angular distribution of radiation from the sample 104 (e.g. associated with scattering and/or diffraction of radiation by the sample 104).

In another embodiment, the inspection system 100 includes a controller 106 coupled to the inspection measurement sub-system 102. In this regard, the controller 106 may be configured to receive data including, but not limited to, inspection data from the inspection measurement sub-system 102. In another embodiment, the controller 106 includes one or more processors 108. For example, the one or more processors 108 may be configured to execute a set of program instructions maintained in a memory device 110, or memory. The one or more processors 108 of a controller 106 may include any processing element known in the art. In this sense, the one or more processors 108 may include any microprocessor-type device configured to execute algorithms and/or instructions. Further, the memory device 110 may include any storage medium known in the art suitable for storing program instructions executable by the associated one or more processors 108. For example, the memory device 110 may include a non-transitory memory medium. As an additional example, the memory device 110 may include, but is not limited to, a read-only memory, a random access memory, a magnetic or optical memory device (e.g., disk), a magnetic tape, a solid state drive and the like. It is further noted that memory device 110 may be housed in a common controller housing with the one or more processors 108.

Figure 2:
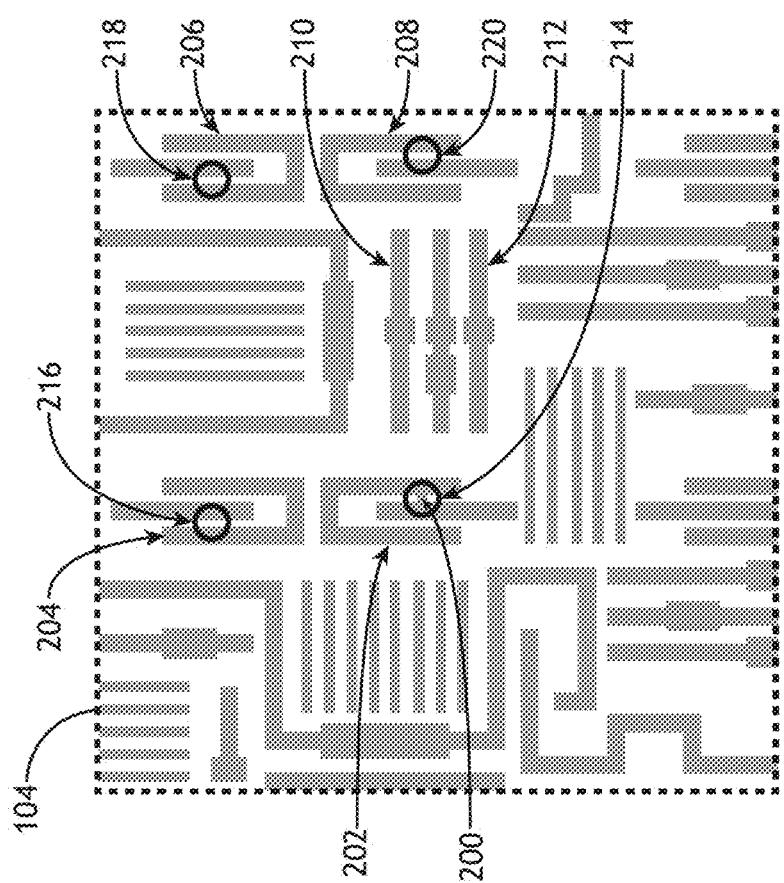
FIG. 2 is a schematic view of a sample including a defect suitable for detection by the inspection system, in accordance with one or more embodiments of the present disclosure.

FIG. 2 is a schematic view of a sample 104 including a defect suitable for detection by the inspection system 100, in accordance with one or more embodiments of the present disclosure. In one embodiment, the sample 104 includes a defect 200 associated with a structure 202. As described previously herein, the defect 200 may be identified by comparing an image of the sample 104 (e.g. a test image) to a reference image. However, noise associated with the reference image may negatively impact the detection sensitivity.

In one embodiment, a defect (e.g. defect 200, or the like) may be detected by utilizing repeated information (e.g. small motif repetition) associated with the sample 104. For example, the sample 104 may include one or more sets of repeated structures. Pixels in a test image associated with a particular structure on the sample 104 may be expected to have pixel values similar to pixels in comparative regions associated with other repeated structures. As illustrated in FIG. 2, the structures 202-208 may form a first set of similar structures, structures 210-212 may form a second set of similar structures, and so on. Further, defect 200 may be detected based on a comparison of pixel values of the defect 200 and pixel values of comparative regions across the sample. For example, defect 200 may be, but is not required to be, detected based on a comparison of pixel values of the defect 200 and pixels in comparative regions 216-220 associated with structures 204-208. By way of another example, defect 200 may be, but is not required to be, detected based on a comparison of pixel values within a surrounding vicinity 214 (e.g. a pixel neighborhood) and pixels in comparative regions 216-220 associated with structures 204-208.

As illustrated in FIG. 2, repeating structures need not have the same orientation on a sample in order to provide repeated data suitable for the detection of defects. For example, structures 202,208 do not have the same orientation on the sample 104 as structures 204-206.

Further, repeated information associated with the sample 104 may not be limited to repeated structures. Rather, it may be the case that a sample 104 may contain a large number of comparable vicinities (e.g. pixel neighborhoods) across the sample associated with portions of a variety of structures such that pixels in comparative vicinities may be expected to have similar pixel values. In another embodiment, pixel statistics are estimated for regions of interest (e.g. target regions) of a test image based on comparative regions across the test image. In another embodiment, reference data (e.g. a reference image, design data, or the like) is utilized to identify comparative regions (e.g. comparative vicinities) across the sample 104. In this regard, defects on a sample may be detected based on an analysis of pixel values within comparative regions of the test image in which the comparative regions may be provided by reference data. In this regard, the inspection system 100 may detect defects in a test image of a sample 104 without a direct comparison of pixels with the test image and a reference image (e.g. without generating a difference image between the test image and a reference image). Accordingly, noise associated with a reference image may be circumvented to provide highly sensitive defect detection.

The term "design data" as used in the present disclosure generally refers to the physical design of an integrated circuit and data derived from the physical design through complex simulation or simple geometric and Boolean operations. In addition, an image of a reticle acquired by a reticle inspection system and/or derivatives thereof may be used as a proxy or proxies for the design data. Such a reticle image or a derivative thereof may serve as a substitute for the design layout in any embodiments described herein that uses design data. Design data and design data proxies are described in U.S. Pat. No. 7,676,077 by Kulkarni issued on Mar. 9, 2010; U.S. patent application Ser. No. 13/115,957 by Kulkarni filed on May 25, 2011; U.S. Pat. No. 8,041,103 by Kulkarni issued on Oct. 18, 2011; and U.S. Pat. No. 7,570,796 by Zafar et al. issued on Aug. 4, 2009, all of which are incorporated herein by reference. Further, the use of design data in directing inspection processes is described generally in U.S. patent application Ser. No. 13/339,805 to Park, filed on Feb. 17, 2012, which is incorporated herein by reference in the entirety.

Design data may include characteristics of individual components and/or layers on the sample 104 (e.g. an insulator, a conductor, a semiconductor, a well, a substrate, or the like), a connectivity relationship between layers on the sample 104, or a physical layout of components and connections (e.g. wires) on the sample 104. In this regard, design data may include a plurality of design pattern elements corresponding to printed pattern elements on the sample 104.

It is noted herein that design data may include what is known as a "floorplan," which contains placement information for pattern elements on the sample 104. It is further noted herein that this information may be extracted from the physical design of a chip usually stored in GDSII or OASIS file formats. The structural behavior or process-design interactions may be a function of the context (surroundings) of a pattern element. By using the floor plan, the analysis proposed can identify pattern elements within the design data, such as polygons describing features to be constructed on a semiconductor layer. Further, the proposed method may provide the coordination information of these repeating blocks as well as contextual data (e.g. the positions of adjacent structures, or the like).

In one embodiment, design data includes one or more graphical representations (e.g. visual representations, symbolic representations, diagrammatic representations, or the like) of pattern elements. For example, design data may include a graphical representation of the physical layout of components (e.g. descriptions of one or more polygons corresponding to printed pattern elements fabricated on the sample 104). Further, design data may include a graphical representation of one or more layers of a sample design (e.g. one or more layers of printed pattern elements fabricated on the sample 104) or the connectivity between the one or more layers. As another example, design data may include a graphical representation of electrical connectivity of components on the sample 104. In this regard, the design data may include a graphical representation of one or more circuits or sub-circuits associated with the sample. In another embodiment, design data includes one or more image files containing graphical representations of one or more portions of the sample 104.

In another embodiment, design data includes one or more textual descriptions (e.g. one or more lists, one or more tables, one or more databases, or the like) of the connectivity of pattern elements of the sample 104. For example, design data may include, but is not limited to, netlist data, circuit simulation data, or hardware description language data. Netlists may include any type of netlist known in the art for providing a description of the connectivity of an electrical circuit including, but not limited to physical netlists, logical netlists, instance-based netlists, or net-based netlists. Further, a netlist may include one or more sub-netlists (e.g. in a hierarchal configuration) to describe circuits and/or sub-circuits on a sample 104. For example, netlist data associated with a netlist may include, but is not limited to, a list of nodes (e.g. nets, wires between components of a circuit, or the like), a list of ports (e.g. terminals, pins, connectors, or the like), a description of electrical components between the nets, (e.g. resistor, capacitor, inductor, transistor, diode, power source, or the like), values associated with the electrical components (e.g. a resistance value in ohms of a resistor, a voltage value in volts of a power source, frequency characteristics of a voltage source, initial conditions of components, or the like). In another embodiment, design data may include one or more netlists associated with specific steps of a semiconductor process flow. For example, a sample 104 may be inspected (e.g. by inspection system 100) at one or more intermediate points in a semiconductor process flow. Accordingly, design data utilized to generate care areas may be specific to the layout of the sample 104 at a current point in the semiconductor process flow. In this regard, a netlist associated with a particular intermediate point in a semiconductor process flow may be derived (e.g. extracted, or the like) from either the physical design layout in combination with a technology file (layer connectivity, electrical properties of each of the layers, and the like) or a netlist associated with a final layout of a sample 104 to include only components present on the wafer at the particular intermediate point in the semiconductor process flow.

Figure 3:
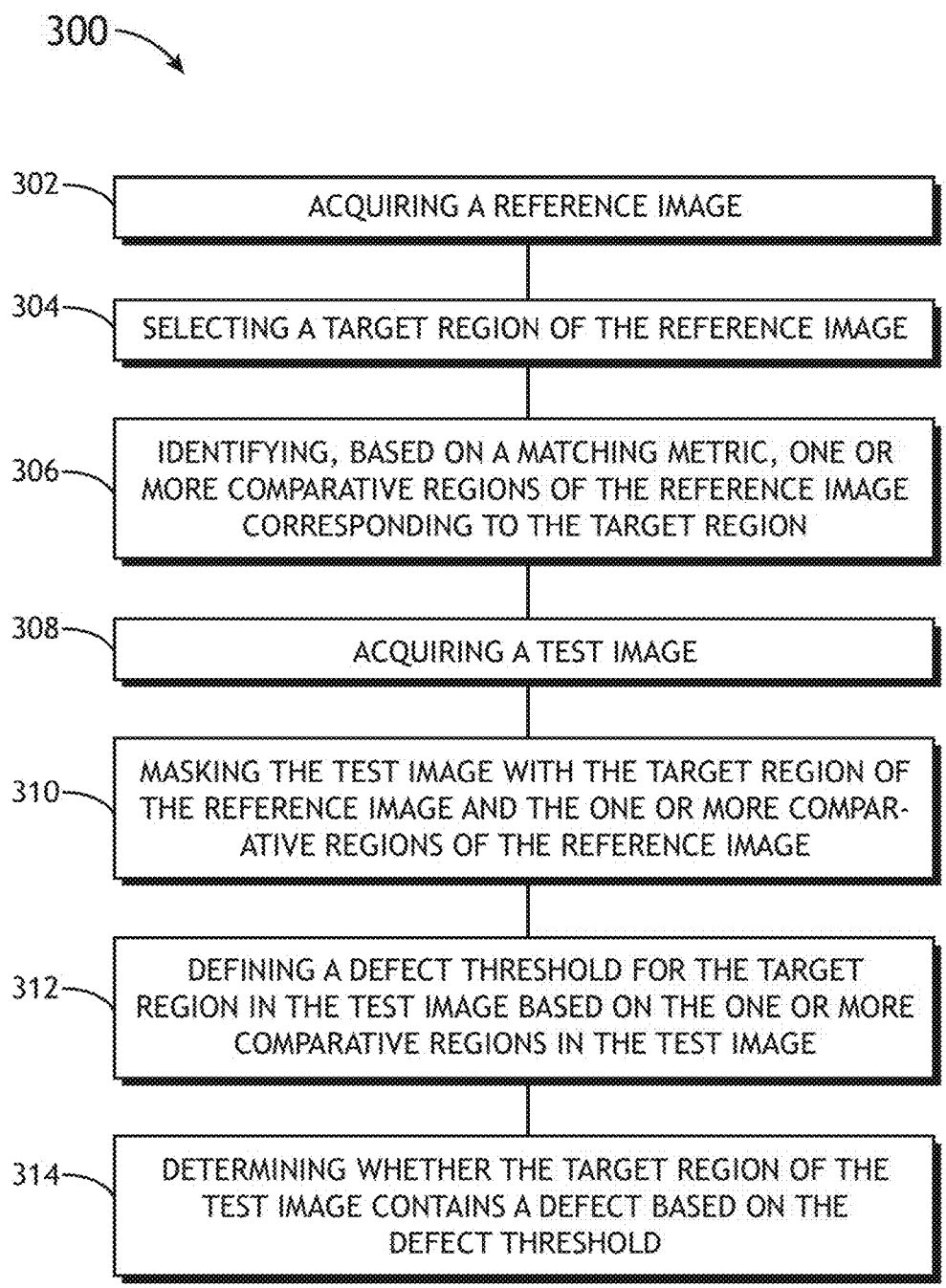
FIG. 3 is a flow diagram illustrating steps performed in a method for inspecting a sample, in accordance with one or more embodiments of the present disclosure.

FIG. 3 is a flow diagram illustrating steps performed in a method 300 for inspecting a sample, in accordance with one or more embodiments of the present disclosure. Applicant notes that the embodiments and enabling technologies described previously herein in the context of inspection system 100 should be interpreted to extend to method 300. It is further noted, however, that the method 300 is not limited to the architecture of inspection system 100.

Each of the steps of the method 300 may be performed as described further herein. The steps may be performed by one or more controllers (e.g. controller 106, or the like), which may be configured according to any of the embodiments described herein. In addition, the method described above may be performed by any of the system embodiments described herein. The method 300 may also include one or more additional steps that may be performed by controller or any system embodiments described herein.

In one embodiment, the method 300 includes a step 302 of acquiring a reference image. The reference image may be representative of a portion of the sample 104 to be inspected for defects. For example, a reference image may include an image of a portion of the sample 104 (e.g. a die, a cell, or the like). By way of another example, the reference image may be formed as an aggregate of multiple reference sub-images. In this regard, each pixel of the reference image may have a value corresponding to a statistical aggregation of corresponding pixels of multiple reference sub-images (e.g. a median of pixel values of corresponding pixels, an average of pixel values of corresponding pixels, or the like). In another embodiment, the reference image includes noise data. For example, the reference image may include noise data associated with multiple reference sub-images. In this regard, the reference image may include data indicating a relative measure of noise for multiple regions of the sample 104 (e.g. variations between pixel values of multiple reference sub-images, or the like).

FIG. 4A is a conceptual view of a reference image 400 having multiple target regions, in accordance with one or more embodiments of the present disclosure. For example, the sample 104 may include a first set of similar structures 402, a second set of similar structures 404, and a third set of similar structures 406. It is to be understood that the first set of similar structures 402, the second set of similar structures 404, and the third set of similar structures 406 are illustrated in FIG. 4A as sets of circles solely for illustrative purposes and that the pixels within each of the first set of similar structures 402, the second set of similar structures 404, and the third set of similar structures 406 may be arranged in any pattern. It is to be further understood that similar structures may be similar according to any metric known in the art such as, but not limited to, shape, size, pixel value, or distribution of pixel values.

The reference image may be formed by any method known in the art. For example, the reference image may be, but is not required to be, generated at least in part using the inspection measurement sub-system 102. Accordingly, the reference image may correspond to an optical image, a scanning electron microscope image, a particle-beam image, or the like. By way of another example, the reference image may be stored by the inspection system 100. For example, the reference image may be stored within the memory device 110 of controller 106. By way of another example, the reference image may be retrieved from an external source (e.g. a data storage system, a server, an additional inspection system, or the like).

In another embodiment, the reference image is generated at least in part using design data. In this regard, the reference image may include one or more aspects of the intended layout (e.g. physical layout, electrical layout, or the like) of one or more features to be inspected.

In another embodiment, the method 300 includes a step 304 of selecting a target region of the reference image. For example, the target region may include one or more pixels of interest to be inspected for defects (e.g. in a given iteration of the method 300). A reference image may include any number of target regions. For instance, each pixel of the test image may be a separate target region. In this regard, each pixel of the reference image may be considered separately. By way of another example, the target region may include a set of pixels in the test image. In this regard, all pixels in the target region may be considered simultaneously. Referring again to FIG. 4A, the target region may include, but is not limited to, pixel set 408 of the first set of similar structures 402, pixel set 410 of the second set of similar structures 404, or pixel set 412 of the third set of similar structures 406. Further, multiple target regions may be considered sequentially or in parallel (e.g. by the controller 106, or the like).

In another embodiment, the method 300 includes a step 306 of identifying, based on a matching metric, one or more comparative regions of the reference image corresponding to the target region. In this regard, the matching metric may control the selection of comparative regions of the reference image that are expected to have similar pixel statistics as the target region. In another embodiment, the method 300 includes a step 308 of acquiring a test image. In another embodiment, the method 300 includes a step 310 of masking the test image with the target region of the reference image and the one or more comparative regions of the reference image. In this regard, location data associated with the one or more comparative regions of the reference image may be used to select relevant portions of the test image. Further, a direct comparison of pixel values of the reference image and the test image (e.g. in a difference image), which may be a significant source of noise, may be avoided.

The test image may be an image (e.g. of sample 104) to be inspected for defects. Further, the test image may be formed by any method known in the art. For example, the test image may be, but is not required to be, generated at least in part using the inspection measurement sub-system 102. Accordingly, the test image may correspond to an optical image, a scanning electron microscope image, a particle-beam image, or the like. By way of another example, the test image may be stored by the inspection system 100. For example, the test image may be stored within the memory device 110 of controller 106. In this regard, the inspection system 100 may operate as a virtual inspection system. By way of another example, the test image may be retrieved from an external source (e.g. a data storage system, a server, an additional inspection system, or the like).

The matching metric may be any type of metric known in the art to compare regions of pixels in images.

In one embodiment, the matching metric includes location data of similarly designed regions of the sample 104 based on design data. For example, design data may be utilized to determine the locations of possible comparative regions. In one embodiment, the locations of possible comparative regions for each pixel of the reference image may be stored by the inspection system 100 (e.g. in the memory device 110, or the like). For example, the possible comparative regions for each pixel of the reference image may be stored in a data storage device (e.g. an indexed data storage device, or the like) for efficient retrieval.

In another embodiment, the matching metric includes a distribution of pixel values around a target pixel (e.g. a target region including a single pixel). For example, a particular distribution of pixel values associated with a matching metric may include, but is not limited to, a particular histogram of pixel values associated with a particular vicinity (e.g. a pixel neighborhood), or a particular spatial distribution of pixels having a relative or absolutely defined set of pixel values. In this regard, comparative regions may include vicinities of pixels throughout the reference image having the same (or substantially similar) pixel value distribution as pixels surrounding the target pixel. Further, a vicinity matching metric may have a particular vicinity pattern (e.g. a layout of pixels with a defined size and/or shape (e.g. rectangular, circular, or the like)). Accordingly, the one or more comparative regions of the reference image may include comparative vicinities across the reference image arranged according to the vicinity pattern in which the comparative vicinities have a pixel value distribution corresponding to that of a target vicinity.

In another embodiment, the dimensions and/or layout of the vicinity pattern are based on the inspection measurement sub-system 102 used to generate the reference image and/or an image of the sample 104 (e.g. a test image). For example, the dimensions and/or layout of the vicinity pattern may be based on an interaction function and/or a resolution of a lithography system used to fabricate the sample. In one instance, the vicinity may, but is not required to, represent approximately 100 nm on the sample 104 and may thus represent an approximate resolution of a lithography system (e.g. a 193-nm lithography system, or the like). By way of another example, dimensions and/or layout of the vicinity pattern may be based on an interaction function and/or a resolution of the inspection measurement sub-system 102.

The one or more comparative regions may be identified in a reference image based on any method known in the art. In one embodiment, comparative regions may be identified based on a pattern matching technique. It is recognized herein that identifying comparative regions in a reference image may potentially be time and/or computationally intensive. For example, the time and/or computational resources required to identify comparative regions using a brute force pattern matching process may negatively impact the overall performance of the inspection system 100. In one embodiment, the inspection system 100 (e.g. via the controller 106) may identify comparative regions using a locality-sensitive hashing technique. For example, the inspection system 100 may utilize kernalized locality-sensitive hashing to efficiently identify comparative regions as "nearest neighbors" of a target vicinity. In this regard, the search method is computationally bound and exploits the stationary nature of the reference image.

In another embodiment, the matching metric includes a defined range of pixel values (e.g. grayscale pixel values, RGB pixel values, or the like). In this regard, the one or more comparative regions of the reference image may include pixels having pixel values within the defined range of pixel values.

Figure 4B:
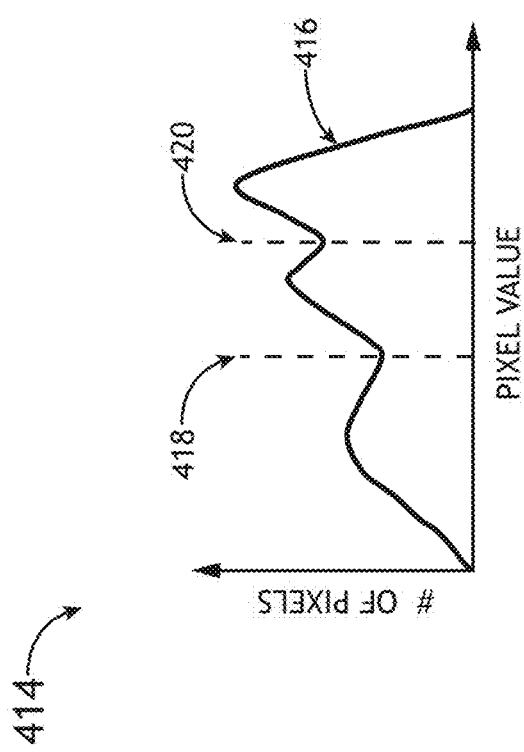
FIG. 4B is a plot of a distribution of pixel values associated with the reference image illustrated in FIG. 4A, in accordance with one or more embodiments of the present disclosure.

FIG. 4B is a plot 414 of a distribution (e.g. a histogram) 416 of pixel values associated with the reference image illustrated in FIG. 4A, in accordance with one or more embodiments of the present disclosure. In one embodiment, reference image 400 is a grayscale image such that pixel values of the reference image represent grayscale values. In another embodiment, the first set of similar structures 402, the second set of similar structures 404, and the third set of similar structures 406 have pixel values that lie in distinguishable ranges. For example, as illustrated in FIG. 4B, three ranges may be identified: pixels with grayscale values lower than cutoff 418, pixels with grayscale values between cutoff 418 and cutoff 420, and pixels with grayscale values higher than cutoff 420. Accordingly, a matching metric including a range of pixel values may be used to identify structures in the reference image having pixels with a pixel value within the same range as the target region.

In another embodiment, location data of the one or more comparative regions are stored by the inspection system 100 (e.g. in the memory device 110, or the like). Location data may include, but is not limited to, locations, sizes, or shapes of the one or more comparative regions in the reference image.

In another embodiment, in step 310, the test image is masked with the test region and the comparative regions. In this regard, the pixels associated with the test region and the comparative regions may be analyzed as a group.

In another embodiment, step 310 includes generating a mask based on the comparative regions identified in step 306. The mask may be generated by any method known in the art. For example, step 310 may include generating a mask to include a binary pattern of pixels corresponding to the locations of the target region and the comparative regions. Further step 310 may include modifying the mask to remove unwanted artifacts such as noise associated with the reference image. In one instance, step 310 includes one or more image processing steps (e.g. filtering, edge detection, morphological image processing, or the like) to remove unwanted artifacts. In one embodiment, step 310 includes generating a mask at least in part using design data. In this regard, the mask may be supplemented and/or modified based on design data such that the mask patterns correspond to designed characteristics of the structures on the sample associated with the comparative regions identified in step 306.

Figure 5C:
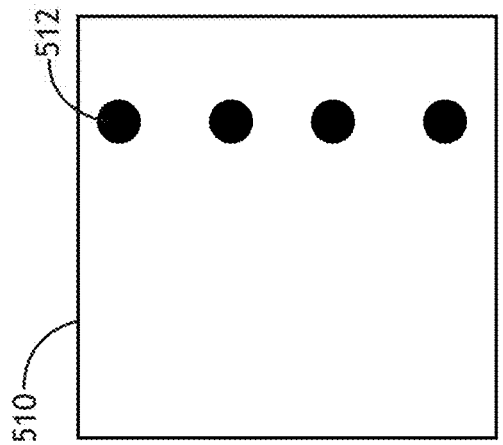
FIG. 5C is a conceptual view of a mask illustrating mask pattern elements corresponding to target region and associated comparative regions.
Figure 5B:
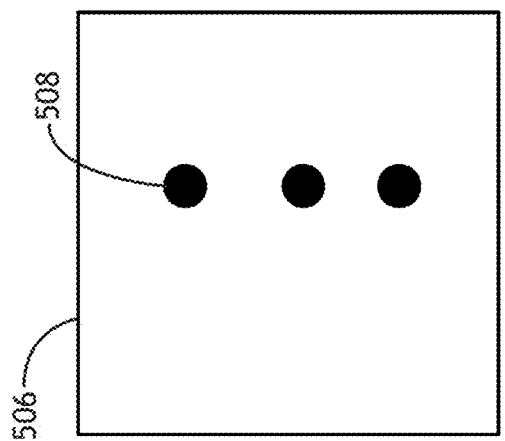
FIG. 5B is a conceptual view of a mask illustrating mask pattern elements corresponding to target region and associated comparative regions.
Figure 5A:
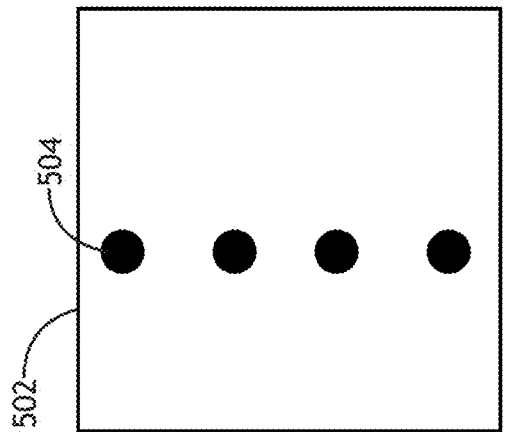
FIG. 5A is a conceptual view of a mask illustrating mask pattern elements corresponding to target region and associated comparative regions.

FIGS. 5A through 5C are conceptual views of exemplary masks associated with different comparative regions, in accordance with one or more embodiments of the present disclosure. FIG. 5A is a conceptual view of a mask 502 illustrating mask pattern elements 504 corresponding to target region 408 (e.g. selected in step 304) and associated comparative regions (e.g. identified in step 306). FIG. 5B is a conceptual view of a mask 506 illustrating mask pattern elements 508 corresponding to target region 410 (e.g. selected in step 304) and associated comparative regions (e.g. identified in step 306). FIG. 5C is a conceptual view of a mask 510 illustrating mask pattern elements 512 corresponding to target region 412 (e.g. selected in step 304) and associated comparative regions (e.g. identified in step 306).

Figure 6:
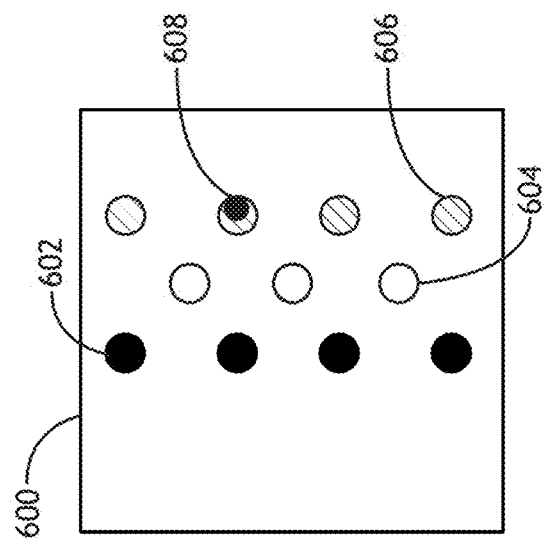
FIG. 6 is a conceptual view of a test image of the sample including a defect, in accordance with one or more embodiments of the present disclosure.

FIG. 6 is a conceptual view of a test image of the sample 104 including a defect, in accordance with one or more embodiments of the present disclosure. For example, the test image 600 may include a first set of similar structures 602, a second set of similar structures 604, and a third set of similar structures 606. Further, a defect 608 may be present on the sample 104 and is manifest in the test image 600 as a modification of pixel values.

In another embodiment, the method 300 includes a step 312 of defining a defect threshold for the target region in the test image based on the one or more comparative regions in the test image. Accordingly, the defect threshold for the target region in the test image may be based on pixel values of the test image itself and the reference image may provide locations of comparative regions of pixels. In another embodiment, the method 300 includes a step 314 of determining whether the target region of the test image contains a defect based on the defect threshold.

The defect threshold may be defined based on the comparative regions using any method known in the art. For example, step 312 may include defining a defect threshold (e.g. for the target region and/or the comparative regions as filtered by the mask in step 310) in order to detect outlier pixels in the pixel value distribution of pixels remaining in the test image after masking such that the outlier pixels may be determined as defects in step 314. In one instance, outlier pixels may be determined based on the presence (or lack thereof) of tails of a histogram of the pixel values of the remaining pixels. In this regard, pixels with pixel values associated with a tail of a histogram may be determined as defects.

Figure 7B:
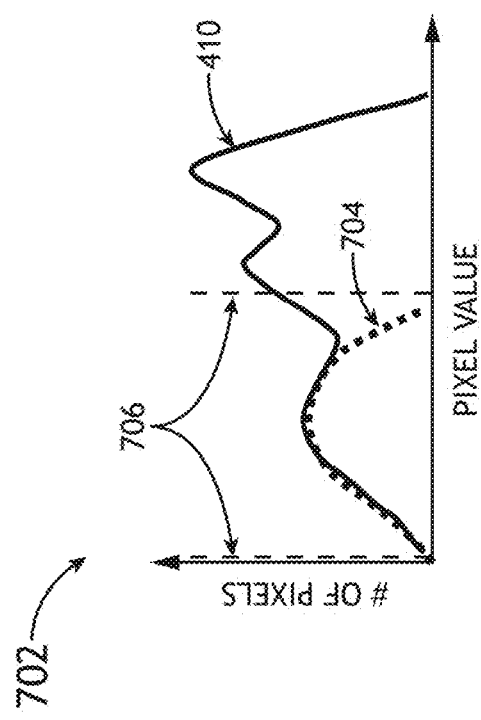
FIG. 7B is a plot of the pixel value distribution of the remaining pixels, in accordance with one or more embodiments of the present disclosure.
Figure 7A:
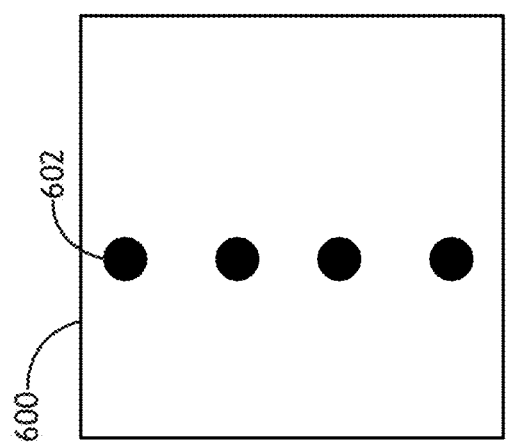
FIG. 7A is a conceptual view of the test image as masked by mask, in accordance with one or more embodiments of the present disclosure.

FIG. 7A is a conceptual view of the test image 600 as masked by mask 502, in accordance with one or more embodiments of the present disclosure. FIG. 7B is a plot 702 of the pixel value distribution 704 of the remaining pixels, in accordance with one or more embodiments of the present disclosure. In one embodiment, the defect threshold is defined by the cutoff values 706 designed to detect outliers in the pixel value distribution 704. For example, as illustrated in FIGS. 7A and 7B, no pixels fall outside the bounds defined by the cutoff values 706 and thus no defects are detected.

Figure 7D:
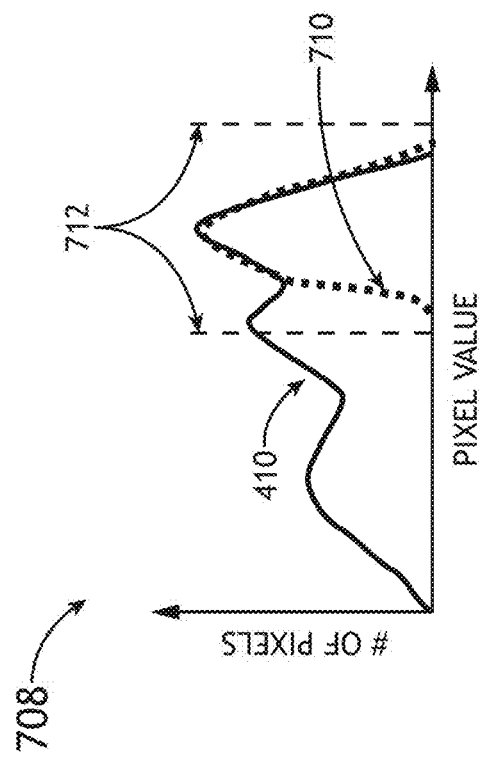
FIG. 7D is a plot of the pixel value distribution of the remaining pixels, in accordance with one or more embodiments of the present disclosure.
Figure 7C:
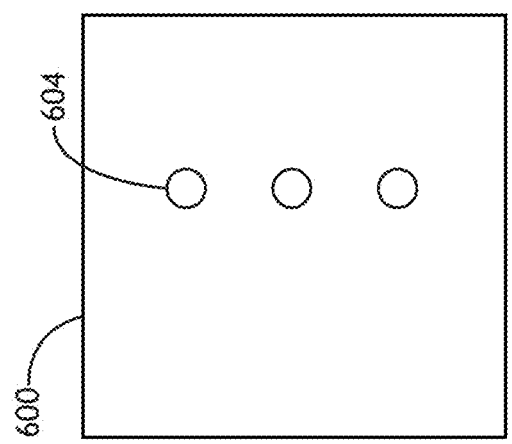
FIG. 7C is a conceptual view of the test image as masked by mask, in accordance with one or more embodiments of the present disclosure.

FIG. 7C is a conceptual view of the test image 600 as masked by mask 604, in accordance with one or more embodiments of the present disclosure. FIG. 7D is a plot 708 of the pixel value distribution 710 of the remaining pixels, in accordance with one or more embodiments of the present disclosure. In one embodiment, the defect threshold is defined by the cutoff values 712 designed to detect outliers in the pixel value distribution 710. For example, as illustrated in FIGS. 7C and 7D, no pixels fall outside the bounds defined by the cutoff values 712 and thus no defects are detected.

Figure 7F:
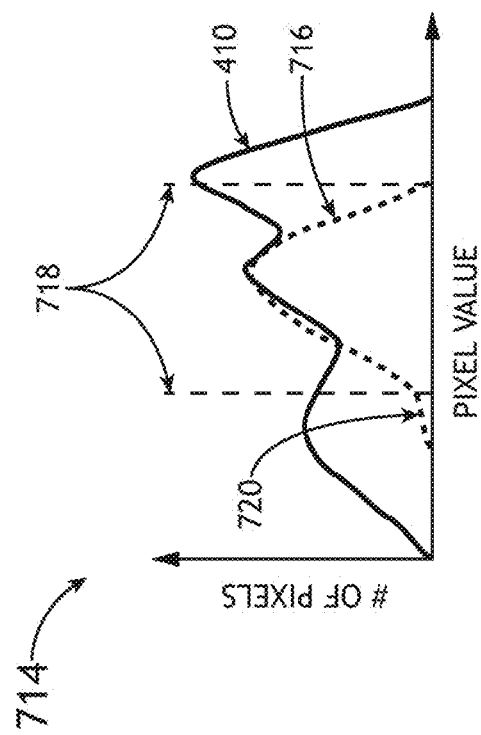
FIG. 7F is a plot of the pixel value distribution of the remaining pixels, in accordance with one or more embodiments of the present disclosure.
Figure 7E:
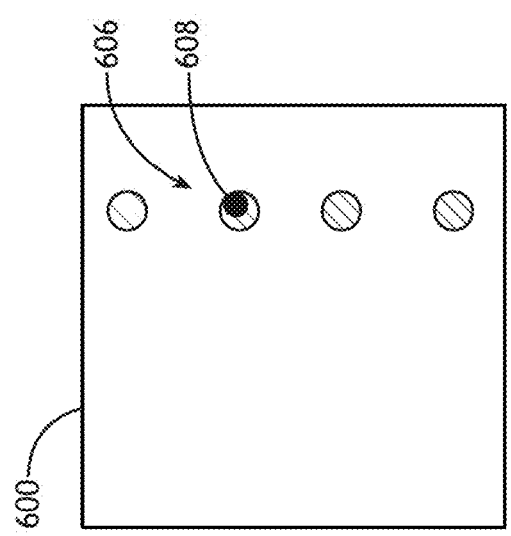
FIG. 7E is a conceptual view of the test image as masked by mask, in accordance with one or more embodiments of the present disclosure.

FIG. 7E is a conceptual view of the test image 600 as masked by mask 606, in accordance with one or more embodiments of the present disclosure. FIG. 7F is a plot 714 of the pixel value distribution 716 of the remaining pixels, in accordance with one or more embodiments of the present disclosure. In one embodiment, the defect threshold is defined by the cutoff values 718 designed to detect outliers in the pixel value distribution 716. For example, as illustrated in FIGS. 7E and 7F, the pixel value distribution 716 includes a tail extending beyond the cutoff values 718 such that outlier pixels 720 beyond the cutoff values 718 are associated with the defect 608.

In another embodiment, returning to an example described previously herein, the defect threshold for a target region including a single target pixel may be determined by calculating pixel value distributions of the comparative vicinities of the test image, estimating a pixel value distribution in the target vicinity of the test image based on the pixel value distributions of the one or more comparative vicinities of the test image, and defining the defect threshold for the target pixel based on the estimated pixel value distribution in the target vicinity.

Figure 8:
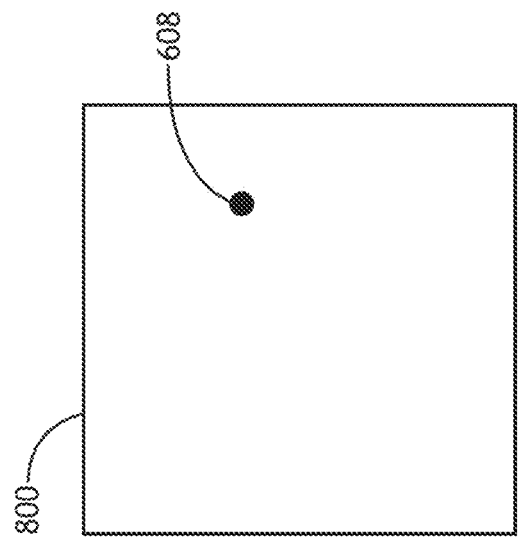
FIG. 8 is a conceptual view of a defect map of the sample, in accordance with one or more embodiments of the present disclosure.

In one embodiment, step 314 includes generating a defect map of the sample 104. FIG. 8 is a conceptual view of a defect map 800 of the sample 104, in accordance with one or more embodiments of the present disclosure. For example, a defect map 800 may include an image of any identified defects. By way of another example, a defect map may include data associated with any identified defects such as, but not limited to, the size, shape, or location of the identified defects.

It is further noted herein that the high detection sensitivity associated with method 300 may provide self-tuning defect detection based on local properties of a test image. In this regard, a defect detection threshold associated with a particular target region may be based on local image properties. This may avoid errors associated with global or semi-global defect detection threshold values associated with alternative techniques that may create a competition between different parts of a test image having different average grayscale values. For example, in one embodiment of the present disclosure, pixel statistics of various comparative regions across the test image may be adjusted (e.g. in step 310) to compensate for large-scale variations in the test image (e.g. variations of the average grayscale values, or the like). Defect detection according to method 300 may additionally provide a high signal to noise ratio sufficient to detect single-pixel defects. Such high detection sensitivity may provide accurate detection of the contours of identified defects and may be highly tolerant to pattern noise.

In another embodiment, the defect detection method 300 may form a part of a hybrid defect detection method. In this regard, the detection method 300 may be supplemented with any additional defect detection method known in the art. For example, in the case that a particular target region in a reference image may not have a sufficient number of comparative regions to provide an accurate determination of a defect threshold (e.g. due to characteristics of the reference image, insufficient repeated structures, or the like), the detection method 300 may be supplemented with an alternative method to define the defect threshold for the particular target region. By way of another example, in the case that a large defect influences the pixel statistics within a vicinity (e.g. a target vicinity and/or a comparative vicinity), the detection method 300 may be supplemented with an alternative method to define the defect threshold for the particular target region.

Referring again to FIG. 1, the inspection system 100 may include any inspection sub-system known in the art.

Figure 9A:
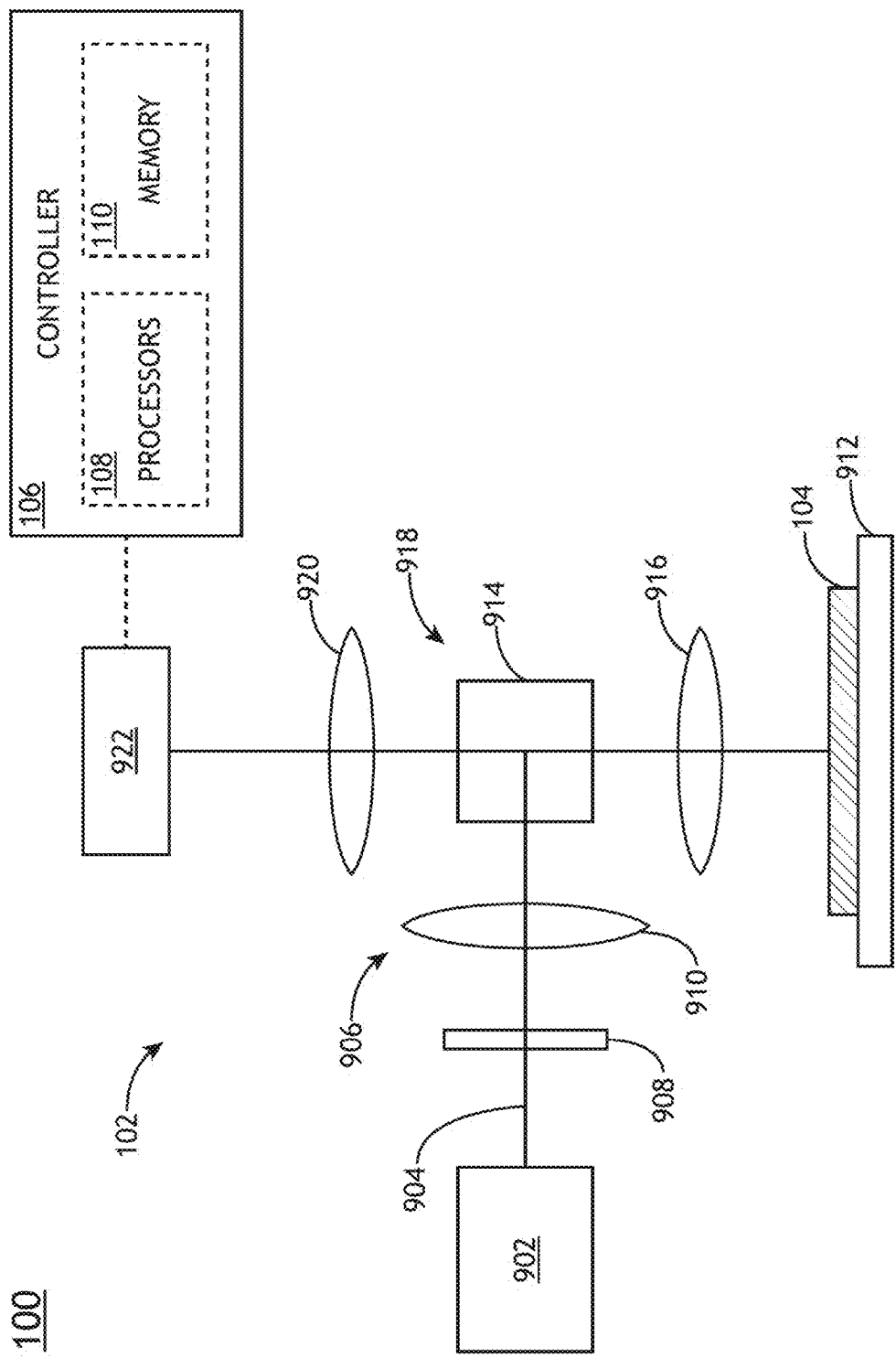
FIG. 9A is a conceptual view of an inspection measurement sub-system configured as an optical inspection sub-system, in accordance with one or more embodiments of the present disclosure.

FIG. 9A is a conceptual view of an inspection measurement sub-system 102 configured as an optical inspection sub-system, in accordance with one or more embodiments of the present disclosure. In one embodiment, the inspection measurement sub-system 102 includes an illumination source 902. The illumination source 902 may include any illumination source known in the art suitable for generating one or more illumination beams 904 (e.g. a beam of photons). For example, the illumination source 902 may include, but is not limited to, a monochromatic light source (e.g. a laser), a polychromatic light source with a spectrum including two or more discrete wavelengths, a broadband light source, or a wavelength-sweeping light source. Further, the illumination source 902 may, but is not limited to, be formed from a white light source (e.g. a broadband light source with a spectrum including visible wavelengths), an laser source, a free-form illumination source, a single-pole illumination source, a multi-pole illumination source, an arc lamp, an electrode-less lamp, or a laser sustained plasma (LSP) source. Further, the illumination beam 904 may be delivered via free-space propagation or guided light (e.g. an optical fiber, a light pipe, or the like).

In another embodiment, the illumination source 902 directs the one or more illumination beams 904 to the sample 104 via an illumination pathway 906. The illumination pathway 906 may include one or more lenses 910. Further, the illumination pathway 906 may include one or more additional optical components 908 suitable for modifying and/or conditioning the one or more illumination beams 904. For example, the one or more optical components 908 may include, but are not limited to, one or more polarizers, one or more filters, one or more beam splitters, one or more diffusers, one or more homogenizers, one or more apodizers, or one or more beam shapers. In one embodiment, the illumination pathway 906 includes a beamsplitter 914. In another embodiment, the inspection measurement sub-system 102 includes an objective lens 916 to focus the one or more illumination beams 904 onto the sample 104.

The illumination source 902 may direct the one or more illumination beams 904 to the sample at any angle via the illumination pathway 906. In one embodiment, as shown in FIG. 9A, the illumination source 902 directs the one or more illumination beams 904 to the sample 104 at normal incidence angle. In another embodiment, the illumination source 902 directs the one or more illumination beams 904 to the sample 104 at a non-normal incidence angle (e.g. a glancing angle, a 45-degree angle, or the like).

In another embodiment, the sample 104 is disposed on a sample stage 912 suitable for securing the sample 104 during scanning. In another embodiment, the sample stage 912 is an actuatable stage. For example, the sample stage 912 may include, but is not limited to, one or more translational stages suitable for selectably translating the sample 104 along one or more linear directions (e.g., x-direction, y-direction and/or z-direction). By way of another example, the sample stage 912 may include, but is not limited to, one or more rotational stages suitable for selectably rotating the sample 104 along a rotational direction. By way of another example, the sample stage 912 may include, but is not limited to, a rotational stage and a translational stage suitable for selectably translating the sample along a linear direction and/or rotating the sample 104 along a rotational direction.

In another embodiment, the illumination pathway 906 includes one or more beam scanning optics (not shown) suitable for scanning the illumination beam 904 across the sample 104. For example, the one or more illumination pathway 906 may include any type of beam scanner known in the art such as, but is not limited to, one or more electro-optic beam deflectors, one or more acousto-optic beam deflectors, one or more galvanometric scanners, one or more resonant scanners, or one or more polygonal scanners. In this way, the surface of a sample 104 may be scanned in an r-theta pattern. It is further noted that the illumination beam 904 may be scanned according to any pattern on the sample. In one embodiment, the illumination beam 904 is split into one or more beams such that one or more beams may be scanned simultaneously.

In another embodiment, the inspection measurement sub-system 102 includes one or more detectors 922 (e.g. one or more optical detectors, one or more photon detectors, or the like) configured to capture radiation emanating from the sample 104 through a collection pathway 918. The collection pathway 918 may include multiple optical elements to direct and/or modify illumination collected by the objective lens 916 including, but not limited to, one or more lenses 920, one or more filters, one or more polarizers, one or more beam blocks, or one or more beamsplitters. It is noted herein that components of the collection pathway 918 may be oriented in any position relative to the sample 104. In one embodiment, the collection pathway includes the objective lens 916 oriented normal to the sample 104. In another embodiment, the collection pathway 918 includes multiple collection lenses oriented to collect radiation from the sample at multiple solid angles.

In one embodiment, the inspection system 100 includes a bright-field inspection system. For example, a bright-field image of the sample 104, or a portion of the sample 104, may be projected onto the detector 922 (e.g. by the objective lens 916, the one or more lenses 920, or the like). In another embodiment, the inspection system 100 includes a dark-field inspection system. For example, the inspection system 100 may include one or more components (e.g. an annular beam block, a dark-field objective lens 916 or the like) to direct the illumination beam 904 to the sample 104 at a large incidence angle such that the image of the sample on the detector 922 is associated with scattered and/or diffracted light. In another embodiment, the inspection system 100 includes an oblique angle inspection system. For example, the inspection system 100 may direct the illumination beam 904 to the sample at an off-axis angle to provide contrast for the inspection of defects. In another embodiment, the inspection system 100 includes a phase contrast inspection system. For example, the inspection system 100 may include one or more phase plates and/or beam blocks (e.g. an annular beam block, or the like) to provide a phase contrast between diffracted and undiffracted light from the sample to provide contrast for defect inspection. In another embodiment, the inspection system 100 may include a luminescence inspection system (e.g. a fluorescence inspection system, a phosphorescence inspection system, or the like). For example, the inspection system 100 may direct an illumination beam 904 with a first wavelength spectrum to the sample 104, and include one or more filters to detect one or more additional wavelength spectra emanating from the sample 104 (e.g. emanating from one or more components of the sample 104 and/or one or more defects on the sample 104). In another embodiment, the inspection system includes one or more pinholes located in confocal positions such that the system 100 may operate as a confocal inspection system.

Figure 9B:
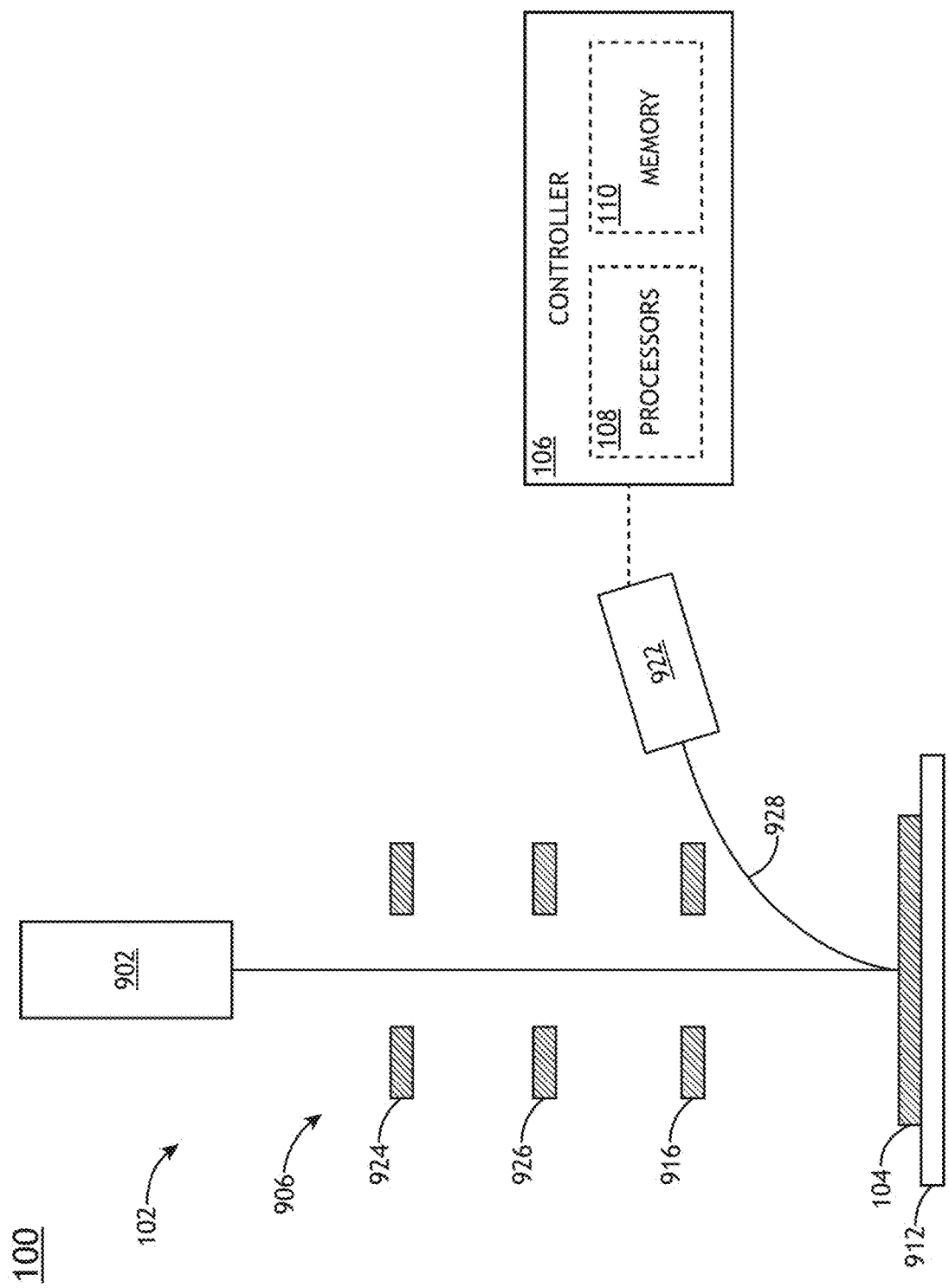
FIG. 9B is a simplified schematic view of an inspection sub-system configured as a particle beam inspection sub-system, in accordance with one or more embodiments of the present disclosure.

FIG. 9B is a simplified schematic view of an inspection sub-system configured as a particle beam inspection sub-system in accordance with one or more embodiments of the present disclosure. In one embodiment, the illumination source 902 includes a particle source configured to generate a particle beam 904. The particle source 902 may include any particle source known in the art suitable for generating a particle beam 904. By way of non-limiting example, the particle source 902 may include, but is not limited to, an electron gun or an ion gun. In another embodiment, the particle source 902 is configured to provide a particle beam 904 with a tunable energy. For example, a particle source 902 including an electron source may, but is not limited to, provide an accelerating voltage in the range of 0.1 kV to 30 kV. As another example, a particle source including an ion source may, but is not required to, provide an ion beam with an energy value in the range of 1 to 50 keV.

In another embodiment, the inspection measurement sub-system 102 includes two or more particle beam sources 902 (e.g. electron beam sources or ion beam sources) for the generation of two or more particle beams 904.

In another embodiment, the illumination pathway 906 includes one or more particle focusing elements 924. For example, the one or more particle focusing elements 924 may include, but are not limited to, a single particle focusing element or one or more particle focusing elements forming a compound system. In another embodiment, an objective lens 916 of the system 100 is configured to direct the particle beam 904 to the sample 104. Further, the one or more particle focusing elements 924 and/or the objective lens 916 may include any type of particle lenses known in the art including, but not limited to, electrostatic, magnetic, uni-potential, or double-potential lenses. Further, the inspection measurement sub-system 102 may include, but is not limited to, one or more electron deflectors, one or more apertures, one or more filters, or one or more stigmators.

In another embodiment, the inspection measurement sub-system 102 includes one or more particle beam scanning elements 926. For example, the one or more particle beam scanning elements may include, but are not limited to, one or more scanning coils or deflectors suitable for controlling a position of the beam relative to the surface of the sample 104. In this regard, the one or more scanning elements may be utilized to scan the particle beam 904 across the sample 104 in a selected pattern.

In another embodiment, the inspection sub-system includes a detector 922 to image or otherwise detect particles emanating from the sample 104. In one embodiment, the detector 922 includes an electron collector (e.g., a secondary electron collector, a backscattered electron detector, or the like). In another embodiment, the detector 922 includes a photon detector (e.g., a photodetector, an x-ray detector, a scintillating element coupled to photomultiplier tube (PMT) detector, or the like) for detecting electrons and/or photons from the sample surface. In a general sense, it is recognized herein that the detector 922 may include any device or combination of devices known in the art for characterizing a sample surface or bulk with a particle beam 904. For example, the detector 922 may include any particle detector known in the art configured to collect backscattered electrons, Auger electrons, transmitted electrons or photons (e.g., x-rays emitted by surface in response to incident electrons, cathodoluminescence of the sample 104, or the like).

In another embodiment, the inspection system 100 includes a voltage contrast imaging (VCI) system. It is recognized herein that inspection systems utilizing particle beams (e.g. electron beams, ion beams, or the like) may be particularly useful for detecting and/or identifying defect mechanisms on a semiconductor sample (e.g. a random logic chip, or the like) due to a high achievable spatial resolution. For example, particle beams may be utilized within an inspection system to image a sample (e.g. by capturing secondary electrons, backscattered electrons, or the like emanating from the sample). Additionally, structures on a sample (e.g. a patterned semiconductor wafer) may exhibit charging effects in response to excitation with a particle beam. Charging effects may include a modification of the number of electrons (e.g. secondary electrons) captured by the system and thus the VCI signal strength. In this regard, a voltage contrast imaging (VCI) system may generate a high-resolution image of a sample in which the intensity of each pixel of the image provides data on the electrical properties of the sample at the pixel location. For example, insulating structures and/or structures that are not connected to a ground source (e.g. are not grounded) may develop a charge (e.g. a positive charge or a negative charge) in response to depletion of particles (e.g. secondary electrons, ions, or the like) induced by the particle beam. Accordingly the induced charge may deflect the trajectories of secondary electrons and reduce the signal intensity captured by a detector. Conversely, grounded structures may not develop a charge and therefore may exhibit a strong signal (e.g. appear bright in an associated VCI image). Further, the signal strength of capacitive structures may be a function of the scan speed and/or the energy of the particle beam. In this regard, a VCI image may include a grayscale image in which the grayscale value of each pixel provides data on the relative electrical characteristics of that location on the wafer. In a further embodiment, the inspection system 100 includes one or more components (e.g. one or more electrodes) configured to apply one or more voltages to one or more locations of the sample 104. In this regard, the system 100 may generate active voltage contrast imaging data.

In another embodiment, the inspection system 100 may include a display (not shown). In another embodiment, the display is communicatively coupled to the controller 106. For example, the display may be communicatively coupled to one or more processors 108 of controller 106. In this regard, the one or more processors 108 may display one or more of the various results of the present invention on display.

The display device may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user interface device (e.g., touchscreen, bezel mounted interface, keyboard, mouse, trackpad, and the like) is suitable for implementation in the present invention.

In another embodiment, the inspection system 100 may include a user interface device (not shown). In one embodiment, the user interface device is communicatively couple to the one or more processors 108 of controller 106. In another embodiment, the user interface device may be utilized by controller 106 to accept selections and/or instructions from a user. In some embodiments, described further herein, the display may be used to display data to a user. In turn, a user may input selection and/or instructions (e.g., a user selection of inspection regions) responsive to inspection data displayed to the user via display device.

The user interface device may include any user interface known in the art. For example, the user interface may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of the display device 105 is suitable for implementation in the present invention. In another embodiment, the user interface may include, but is not limited to, a bezel mounted interface.

It is noted herein that FIGS. 9A and 9B, along with the corresponding descriptions above, are provided merely for illustration and should not be interpreted as limiting. It is anticipated that a number of equivalent or additional configurations may be utilized within the scope of the present invention.

Further, the system 100 may be configured as a "real" or a "virtual" inspection system. For example, the system 100 may generate actual images or other output data associated with the sample 104. In this regard, the system 100 may be configured as a "real" inspection system, rather than a "virtual" system. By way of another example, a storage medium (not shown) and the controller 106 described herein may be configured as a "virtual" inspection system. Accordingly, the system 100 may not operate on a physical sample, but may rather reproduce and/or stream stored data (e.g. data stored in a memory medium 110, or the like) as if a physical sample were being scanned. In this regard, the output of a "detector" may be data that was previously generated by one or more detectors (e.g. a detector 922) of an actual inspection system in a previous step. Systems and methods configured as "virtual" inspection systems are described in commonly assigned U.S. Pat. No. 8,126,255 issued on Feb. 28, 2012, and U.S. Pat. No. 9,222,895, issued on Dec. 29, 2015, both of which are incorporated by reference in their entirety.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A defect detection method comprising:
acquiring a reference image;
selecting a target region of the reference image;
identifying, based on a matching metric, one or more comparative regions of the reference image corresponding to the target region;
acquiring a test image;
masking the test image with the target region of the reference image and the one or more comparative regions of the reference image to generate a masked test image;
defining a defect threshold based on a pixel value distribution including pixel values for pixels within the one or more comparative regions of the test image; and
determining whether the test image contains a defect by comparing a distribution of pixel values in the masked test image to the defect threshold.

2. The defect detection method of claim 1, wherein the matching metric includes a selected range of pixel values, wherein identifying the one or more comparative regions of the reference image comprises:
identifying one or more regions of the reference image having pixel values within the selected range.

3. The defect detection method of claim 2, wherein the pixel values include grayscale values.

4. The defect detection method of claim 2, wherein the pixel value distribution includes pixel values for pixels within the target region and the one or more comparative regions in the test image.

5. The defect detection method of claim 4, wherein the pixel value distribution includes a histogram of the pixel values for the pixels within the target region and the one or more comparative regions in the test image.

6. The defect detection method of claim 4, wherein defining the defect threshold for the target region based on the pixel distribution comprises:
defining the defect threshold for the target region to identify outliers associated with a tail of the pixel value distribution.

7. The defect detection method of claim 4, wherein determining whether the test image contains a defect by comparing a distribution of pixel values in the masked test image to the defect threshold comprises:
    determining whether the target region or any of the one or more comparative regions of the test image contains a defect based on the defect threshold.

8. The defect detection method of claim 1, wherein the target region includes a single target pixel.

9. The defect detection method of claim 8, wherein identifying the one or more comparative regions of the reference image comprises:
    defining a vicinity pattern including a defined layout of pixels;
    defining a target vicinity in the reference image arranged according to the vicinity pattern, wherein the target vicinity includes the target pixel, wherein the matching metric includes a pixel value distribution of the target vicinity; and
    identifying one or more comparative vicinities of the reference image arranged according to the vicinity pattern based on the matching metric, wherein the one or more comparative regions include the one or more comparative vicinities.

10. The defect detection method of claim 9, wherein identifying the one or more comparative vicinities of the reference image comprises:
    identifying one or more comparative vicinities of the reference image based on locality-sensitive hatching.

11. The defect detection method of claim 9, wherein identifying the one or more comparative vicinities of the reference image comprises:
    identifying one or more comparative vicinities of the reference image based on kernalized locality-sensitive hatching.

12. The defect detection method of claim 9, wherein identifying the one or more comparative vicinities of the reference image comprises:
    identifying one or more comparative vicinities of the reference images based on a pattern-matching technique.

13. The defect detection method of claim 9, wherein identifying the one or more comparative vicinities of the reference image comprises:
    identifying one or more comparative vicinities of the reference images based on design data.

14. The defect detection method of claim 9, further comprising:
    storing one or more locations of the one or more comparative vicinities in a database.

15. The defect detection method of claim 14, wherein the database comprises:
    an indexed database.

16. The defect detection method of claim 9, wherein defining the defect threshold for the target region in the test image based on the one or more comparative regions in the test image comprises:
    calculating one or more pixel value distributions of the one or more comparative vicinities of the test image;
    estimating a pixel value distribution in the target vicinity of the test image based on the pixel value distributions of the one or more comparative vicinities of the test image; and
    defining the defect threshold for the target pixel based on the estimated pixel value distribution in the target vicinity.

17. The defect detection method of claim 16, wherein determining whether the test image contains a defect comprises:
    determining whether the target region of the test image contains a defect based on a comparison of the estimated pixel value distribution and an actual pixel value distribution of the target vicinity in the test image.

18. The defect detection method of claim 9, wherein a size of the vicinity pattern is based on an interaction function of a measurement tool used to generate the target image.

19. The defect detection method of claim 9, wherein a size of the vicinity pattern is based on a resolution of a measurement tool used to generate the target image.

20. The defect detection method of claim 1, wherein reference data comprises:
    at least one of a reference image or design data.

21. The defect detection method of claim 20, wherein the reference image is based on a golden die.

22. The defect detection method of claim 20, wherein the reference image is based on at least one reference die.

23. The defect detection method of claim 20, wherein the reference image comprises:
    a median reference die.

24. The defect detection method of claim 20, wherein the design data comprises:
    at least one of netlist data or a design layout of one or more structures.

25. A defect detection system comprising:
    an inspection sub-system comprising:
        an illumination source configured to generate a beam of illumination;
        a set of illumination optics to direct the beam of illumination to a sample; and
        a detector configured to collect illumination emanating from the sample; and
    a controller communicatively coupled to the detector, the controller including a memory device and one or more processors configured to execute program instructions configured to cause the one or more processors to:
        acquire a reference image;
        select a target region of the reference image;
        identify, based on a matching metric, one or more comparative regions of the reference image corresponding to the target region;
        acquire a test image;
        mask the test image with the target region of the reference image and the one or more comparative regions of the reference image to generate a masked test image;
        define a defect threshold based on a pixel value distribution including pixel values for pixels within the one or more comparative regions of the test image; and
        determine whether the test image contains a defect by comparing a distribution of pixel values in the masked test image to the defect threshold.

26. The defect detection system of claim 25, wherein the matching metric includes a selected range of pixel values, wherein identifying the one or more comparative regions of the reference image comprises:
    identifying one or more regions of the reference image having pixel values within the selected range.

27. The defect detection system of claim 26, wherein the pixel values include grayscale values.

28. The defect detection system of claim 26, wherein the pixel value distribution includes pixel values for pixels within the target region and the one or more comparative regions in the test image.

29. The defect detection system of claim 28, wherein the pixel value distribution includes a histogram of the pixel values for the pixels within the target region and the one or more comparative regions in the test image.

30. The defect detection system of claim 28, wherein defining the defect threshold for the target region based on the pixel distribution comprises:
defining the defect threshold for the target region to identify outliers associated with a tail of the pixel value distribution.

31. The defect detection system of claim 28, wherein determining whether the test image contains a defect by comparing a distribution of pixel values in the masked test image to the defect threshold comprises:
determining whether the target region or any of the one or more comparative regions of the test image contains a defect based on the defect threshold.

32. The defect detection system of claim 25, wherein the target region includes a single target pixel.

33. The defect detection system of claim 32, wherein identifying the one or more comparative regions of the reference image comprises:
defining a vicinity pattern including a defined layout of pixels;
defining a target vicinity in the reference image arranged according to the vicinity pattern, wherein the target vicinity includes the target pixel, wherein the matching metric includes a pixel value distribution of the target vicinity; and
identifying one or more comparative vicinities of the reference image arranged according to the vicinity pattern based on the matching metric, wherein the one or more comparative regions include the one or more comparative vicinities.

34. The defect detection system of claim 33, wherein identifying the one or more comparative vicinities of the reference image comprises:
identifying one or more comparative vicinities of the reference image based on locality-sensitive hatching.

35. The defect detection system of claim 33, wherein identifying the one or more comparative vicinities of the reference image comprises:
identifying one or more comparative vicinities of the reference image based on kernalized locality-sensitive hatching.

36. The defect detection system of claim 33, wherein identifying the one or more comparative vicinities of the reference image comprises:
identifying one or more comparative vicinities of the reference image based on a pattern-matching technique.

37. The defect detection system of claim 33, wherein identifying the one or more comparative vicinities of the reference image comprises:
identifying one or more comparative vicinities of the reference images based on design data.

38. The defect detection system of claim 33, further comprising:
storing one or more locations of the one or more comparative vicinities in a database.

39. The defect detection system of claim 38, wherein the database comprises:
an indexed database.

40. The defect detection system of claim 33, wherein defining the defect threshold for the target region in the test image based on the one or more comparative regions in the test image comprises:
calculating one or more pixel value distributions of the one or more comparative vicinities of the test image;
estimating a pixel value distribution in the target vicinity of the test image based on the pixel value distributions of the one or more comparative vicinities of the test image; and
defining the defect threshold for the target pixel based on the estimated pixel value distribution in the target vicinity.

41. The defect detection system of claim 40, wherein determining whether the target region of the test image contains a defect comprises:
determining whether the target region of the test image contains a defect based on a comparison of the estimated pixel value distribution and an actual pixel value distribution of the target vicinity in the test image.

42. The defect detection system of claim 33, wherein a size of the vicinity pattern is based on an interaction function of a measurement tool used to generate the target image.

43. The defect detection system of claim 33, wherein a size of the vicinity pattern is based on a resolution of a measurement tool used to generate the target image.

44. The defect detection system of claim 25, wherein reference data comprises:
at least one of a reference image or design data.

45. The defect detection system of claim 44, wherein the reference image is based on a golden die.

46. The defect detection system of claim 44, wherein the reference image is based on at least one reference die.

47. The defect detection system of claim 44, wherein the reference image comprises:
a median reference die.

48. The defect detection system of claim 44, wherein the design data comprises:
at least one of netlist data or a design layout of one or more structures.

49. The defect detection system of claim 25, wherein the beam of illumination comprises:
at least one of a beam of photons or a beam of particles.

50. The defect detection system of claim 49, wherein the beam of particles comprises:
at least one of a beam of electrons or ions.

51. The defect detection system of claim 25, wherein the set of illumination optics comprises:
at least one of photon optics or particle optics.

52. The defect detection system of claim 25, wherein the detector comprises:
at least one of a photon detector or a particle detector.

53. A defect detection system comprising:
an inspection sub-system comprising:
an illumination source configured to generate a beam of illumination;
a set of illumination optics to direct the beam of illumination to a sample; and
a detector configured to collect illumination emanating from the sample; and
a controller communicatively coupled to the detector, the controller including a memory device and one or more processors configured to execute program instructions configured to cause the one or more processors to:
acquire a reference image;
select a target pixel of the reference image;

define a vicinity pattern including a defined layout of pixels;
define a target vicinity in the reference image arranged according to the vicinity pattern, wherein the target vicinity includes the target pixel;
identify, based on a matching metric, one or more comparative vicinities of the reference image corresponding to a target region, wherein the matching metric includes a pixel value distribution of the target vicinity;
acquire a test image;
mask the test image with the target region of the reference image and the one or more comparative vicinities of the reference image;
calculate one or more pixel value distributions of the one or more comparative vicinities of the test image;
estimate a pixel value distribution in the target vicinity of the test image based on the pixel value distributions of the one or more comparative vicinities of the test image;
defining a defect threshold for the target pixel based on the estimated pixel value distribution in the target vicinity; and
determine whether the target pixel of the test image contains a defect based on the defect threshold.

54. A defect detection method comprising:
acquiring a reference image;
selecting a target region of the reference image;
identifying, based on a matching metric, one or more comparative regions of the reference image corresponding to the target region;
acquiring a test image;
masking the test image with the target region of the reference image and the one or more comparative regions of the reference to generate a masked test image;
determining a pixel value distribution including pixel values for pixels within the target region and one or more comparative regions in the test image;
defining a defect threshold to identify outliers associated with a tail of the pixel value distribution; and
determining whether the test image contains a defect by comparing a distribution of pixel values in the masked test image to the defect threshold.

* * * * *